United States Patent
Conchieri et al.

(10) Patent No.: US 9,360,214 B2
(45) Date of Patent: Jun. 7, 2016

(54) CATALYTIC COMBUSTION AIR HEATING SYSTEM

(71) Applicant: General Electric Company, Schenectady, NY (US)

(72) Inventors: John Anthony Conchieri, Greenfield Center, NY (US); Roy Marshall Washam, Clinton, SC (US); Gilbert Otto Kraemer, Greer, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 586 days.

(21) Appl. No.: 13/858,192

(22) Filed: Apr. 8, 2013

(65) Prior Publication Data

US 2014/0298814 A1    Oct. 9, 2014

(51) Int. Cl.

| | | |
|---|---|---|
| F02C 1/00 | (2006.01) |
| F23R 3/00 | (2006.01) |
| F02C 7/08 | (2006.01) |
| F02C 7/224 | (2006.01) |
| F24H 1/00 | (2006.01) |
| F02C 3/20 | (2006.01) |
| F23R 3/40 | (2006.01) |

(52) U.S. Cl.
CPC ............... *F23R 3/005* (2013.01); *F02C 3/205* (2013.01); *F02C 7/08* (2013.01); *F02C 7/224* (2013.01); *F23R 3/40* (2013.01); *F24H 1/0045* (2013.01); *F23L 2900/15042* (2013.01)

(58) Field of Classification Search
CPC ............. F23R 3/40; F23R 3/005; F23R 3/34; F23R 3/346; F23C 13/00; F23C 13/06; F23C 2900/13002; F02C 7/228; F02C 7/08
See application file for complete search history.

(56) References Cited

U.S. PATENT DOCUMENTS

| | | | | |
|---|---|---|---|---|
| 3,641,763 | A * | 2/1972 | Cole | F02C 7/105 |
| | | | | 165/10 |
| 3,797,231 | A * | 3/1974 | McLean | F23R 3/40 |
| | | | | 431/328 |
| 4,168,945 | A | 9/1979 | Kirby | |
| 5,161,366 | A | 11/1992 | Beebe | |
| 5,623,819 | A * | 4/1997 | Bowker | F23C 6/047 |
| | | | | 60/723 |
| 5,729,967 | A * | 3/1998 | Joos | F02C 3/28 |
| | | | | 60/39.12 |
| 6,205,768 | B1 | 3/2001 | Dibble et al. | |
| 6,339,925 | B1 | 1/2002 | Hung et al. | |
| 6,397,787 | B1 | 6/2002 | Yamada et al. | |

(Continued)

OTHER PUBLICATIONS

Preliminary Study of the Catalytic Combustor Concept as Applied to Aircraft Gas Turbines, AFAPL-TR-74-32, Wright Patterson Air force Base, William S. Blazowski, et al., May 1974, pp. 1-55; NTIS, Springfield VA.

(Continued)

*Primary Examiner* — Gerald L Sung
(74) *Attorney, Agent, or Firm* — Dority & Manning, PA

(57) ABSTRACT

A system for pre-heating a working fluid within a combustor includes a compressor for providing the working fluid to the combustor. An outer casing is disposed downstream from the compressor. The outer casing at least partially defines a high pressure plenum that at least partially surrounds the combustor. A combustion chamber is defined within the combustor downstream from the high pressure plenum. A catalytic combustor is disposed within the high pressure plenum upstream from the combustion chamber so as to provide thermal energy to the working fluid upstream from the combustion chamber.

17 Claims, 5 Drawing Sheets

(56) References Cited

U.S. PATENT DOCUMENTS

| | | | | |
|---|---|---|---|---|
| 6,415,608 | B1* | 7/2002 | Newbury | F23C 13/00 417/170 |
| 2002/0182555 | A1* | 12/2002 | Carroni | F23R 3/40 431/147 |
| 2003/0126863 | A1* | 7/2003 | Critchley | F23R 3/40 60/777 |
| 2003/0134240 | A1* | 7/2003 | Critchley | F02C 9/16 431/7 |
| 2003/0192318 | A1* | 10/2003 | Sprouse | F23R 3/40 60/777 |
| 2009/0301598 | A1* | 12/2009 | Rubio | F23C 13/06 138/177 |
| 2011/0067401 | A1* | 3/2011 | Kajita | F02C 3/22 60/723 |
| 2013/0111913 | A1* | 5/2013 | Hamrin | F02C 3/22 60/772 |

OTHER PUBLICATIONS

Catalytic Combustor for Fuel-Flexible Turbine, W. R. Laster, Oct. 2004 through Mar. 2005, pp. 1-17, Siemens Westinghouse Power Corp., Orlando, FL.

3.2.2.1 Fuel-Rich Catalytic Combustion, Smith, Etemad, Karim and Pfefferle, pp. 265-284; Gas Turbine Group, Precision Combustion, Inc., CT.

Development of an Advanced Flameless Combustion Heat Source Utilizing Heavy Fuels, Clifford G. Welles, Technical Report NATICK/TR-10/018, by Clifford G. Welles, pp. 1-72, Catalytic Devices International, LLC, Pleasanton, CA.

* cited by examiner

CATALYTIC COMBUSTION AIR HEATING SYSTEM

FIELD OF THE INVENTION

The present invention generally relates to a gas turbine. More particularly, this invention relates to a catalytic combustion air heating system for heating a working fluid upstream from a combustion chamber defined within a combustor of the gas turbine.

BACKGROUND OF THE INVENTION

A typical gas turbine includes an inlet section, a compressor section, a combustion section, a turbine section, and an exhaust section. The inlet section cleans and conditions a working fluid (e.g., air) and supplies the working fluid to the compressor section. The compressor section progressively increases the pressure of the working fluid and supplies a compressed working fluid to the combustion section. The compressed working fluid and a fuel are mixed within the combustion section and burned in a combustion chamber to generate combustion gases having a high temperature and pressure. The combustion gases are routed along through a hot gas path into the turbine section where they expand to produce work. For example, expansion of the combustion gases in the turbine section may rotate a shaft connected to a generator to produce electricity.

The combustion section generally includes one or more combustors annularly arranged and disposed between the compressor section and the turbine section. Various parameters influence the design and operation of the combustors. For example, gas turbine manufacturers are regularly tasked to increase gas turbine efficiency without producing undesirable air polluting emissions. The primary air polluting emissions typically produced by gas turbines burning conventional hydrocarbon fuels are oxides of nitrogen (NOx), carbon monoxide (CO), and unburned hydrocarbons (UHCs). Oxidation of molecular nitrogen and thus the formation of NOx in air breathing engines such as gas turbines is an exponential function of temperature. The higher the temperature of the combustion gases, the higher the rate of formation of the undesirable NOx emissions.

One way to lower the temperature of the combustion gases, thus controlling the formation of NOx, is to deploy a lean pre-mix combustion system. The lean pre-mix combustion system operates by pre-mixing the fuel and working fluid to provide a lean (or air rich) pre-mixed combustible mixture to the combustion chamber. As a result, during combustion the heat capacity or thermal capacitance of the excess air present in the air rich or lean combustible mixture allows for heat absorption within the combustion chamber, thus reducing the temperature of the combustion gases, thereby reducing the formation of NOx emissions.

One factor that determines the operability range of a lean pre-mix combustion system in the lean pre-mix mode is the temperature of the compressed working fluid as it enters the combustion chamber. For example, if the temperature of the compressed working fluid entering the combustion chamber falls below certain temperatures, a large temperature rise and a large heat release may occur within the combustion chamber and across the combustion system as the lean pre-mix combustible mixture is burned. As a result, the amplitude of various pressure pulsations within the combustor also known as combustion dynamics may be increased. In addition, the large temperature rise and heat release may also result in CO production that may exceed emissions compliance standards.

The temperature of the compressed working fluid is generally influenced by the operational mode of the gas turbine and by the local ambient temperature at an inlet to the compressor. Most lean pre-mix combustion systems are designed to operate within the lean pre-mix mode at ISO standard day conditions which in the power industry correspond to an ambient temperature of 59 degrees Fahrenheit. Generally, the local ambient temperature has the greatest effect on combustor dynamics and CO levels when the gas turbine is operated at less than full-speed/full-load conditions such as during part-load operation where the compressor is operated at less than full capacity. As a result, less thermal energy is transferred to the working fluid as it flows through the compressor to the combustor. Accordingly, a system for heating the compressed working fluid within the combustor upstream from the combustion chamber would be useful.

BRIEF DESCRIPTION OF THE INVENTION

Aspects and advantages of the invention are set forth below in the following description, or may be obvious from the description, or may be learned through practice of the invention.

One embodiment of the present invention is a system for heating a compressed working fluid within a combustor. The system includes a compressor for providing the compressed working fluid to the combustor. An outer casing is disposed downstream from the compressor. The outer casing at least partially defines a high pressure plenum that at least partially surrounds the combustor. A combustion chamber is defined within the combustor downstream from the high pressure plenum. A catalytic combustor is disposed within the high pressure plenum upstream from the combustion chamber. The catalytic combustor provides thermal energy to the working fluid upstream from the combustion chamber.

Another embodiment of the present invention is a combustor for a gas turbine. The combustor includes a combustion liner and a combustion chamber that is at least partially defined within the combustion liner. A fuel nozzle is disposed upstream from the combustion chamber. The fuel nozzle at least partially defines a pre-mix flow chamber that is upstream from the combustion chamber. An outer casing at least partially surrounds at least a portion of the combustion liner. A high pressure plenum is defined within the outer casing upstream from the pre-mix flow chamber. A catalytic combustor is disposed within the high pressure plenum upstream from the pre-mix flow chamber.

Another embodiment of the present invention includes a gas turbine. The gas turbine includes a compressor for providing a flow of a compressed working fluid. A combustion section is disposed downstream from the compressor and includes an outer casing that defines a high pressure plenum. A turbine is disposed downstream from the combustion section. The combustion section further includes a combustor that extends within the high pressure plenum. The combustor comprises a combustion liner, a combustion chamber defined within the combustion liner downstream from the high pressure plenum, and a fuel nozzle that is disposed upstream from the combustion chamber. The gas turbine further includes a catalytic combustor that is disposed within the high pressure plenum upstream from the combustion chamber so as to provide thermal energy to the flow of the compressed working fluid.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
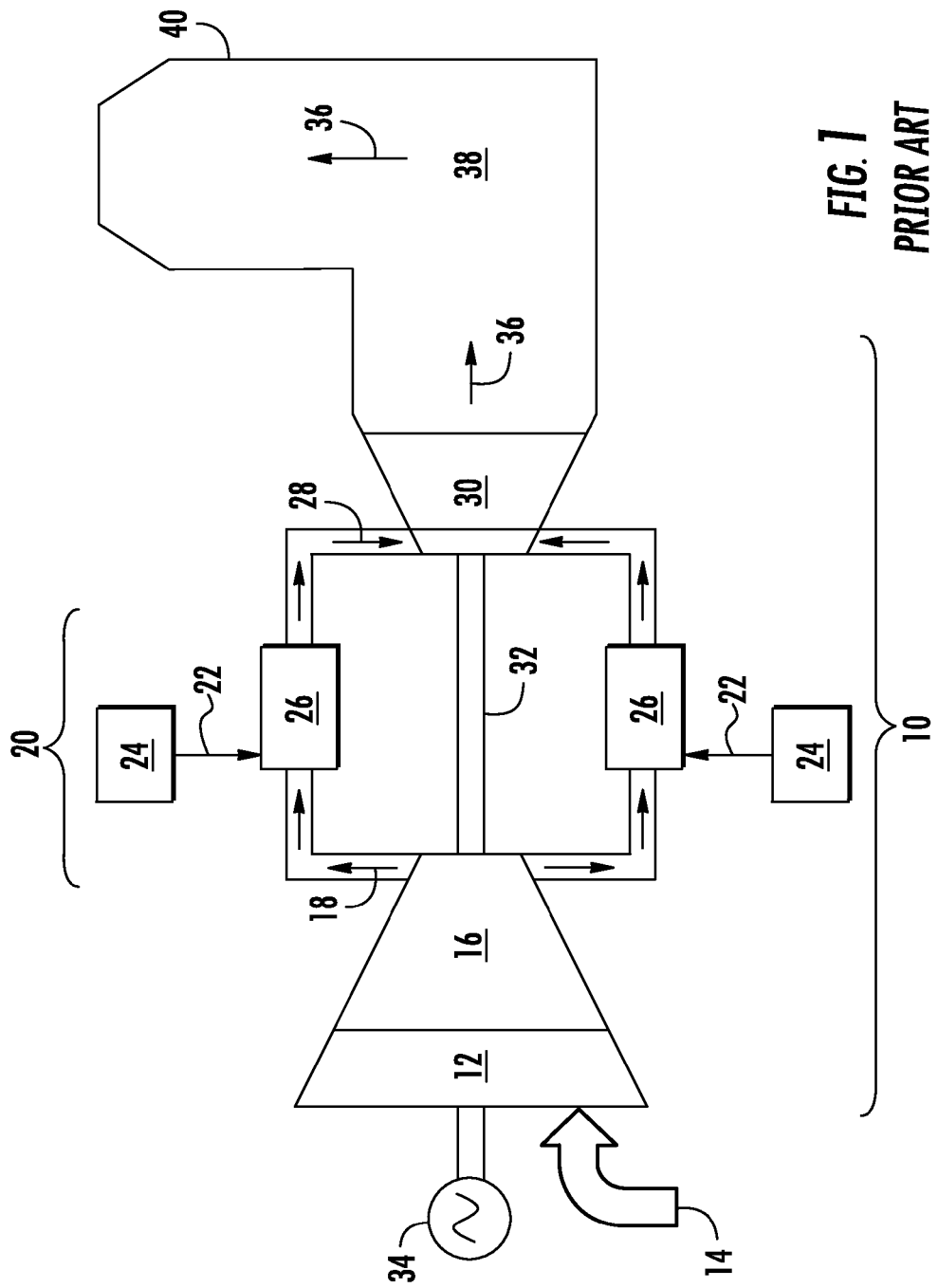
FIG. 1 is a functional block diagram of an exemplary gas turbine within the scope of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The terms "upstream," "downstream," "radially," and "axially" refer to the relative direction with respect to fluid flow in a fluid pathway. For example, "upstream" refers to the direction from which the fluid flows, and "downstream" refers to the direction to which the fluid flows. Similarly, "radially" refers to the relative direction substantially perpendicular to the fluid flow, and "axially" refers to the relative direction substantially parallel to the fluid flow. The term "circumferentially" refers to a relative direction that extends around an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring now to the drawings, wherein identical numerals indicate the same elements throughout the figures, FIG. 1 provides a functional block diagram of an exemplary gas turbine 10 that may incorporate various embodiments of the present invention. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor section where a compressor 16 progressively imparts kinetic and thermal energy to the working fluid 14 to produce a compressed working fluid 18 at a highly energized state.

The compressed working fluid 18 flows from the compressor to a combustion section 20 where it is mixed with a fuel 22 from a fuel supply system 24 to form a combustible mixture within one or more combustors 26. The combustible mixture is burned to produce combustion gases 28 having a high temperature and pressure. The combustion gases 28 flow through a turbine 30 of a turbine section to produce work. For example, the turbine 30 may be connected to a shaft 32 so that rotation of the turbine 28 drives the compressor 16 to produce the compressed working fluid 18. Alternately or in addition, the shaft 32 may connect the turbine 30 to a generator 34 for producing electricity. Exhaust gases 36 from the turbine 30 flow through an exhaust section 38 that connects the turbine 30 to an exhaust stack 40 downstream from the turbine 30. The exhaust section 38 may include, for example, a heat recovery steam generator (not shown) for cleaning and extracting additional heat from the exhaust gases 36 prior to release to the environment.

Figure 2:
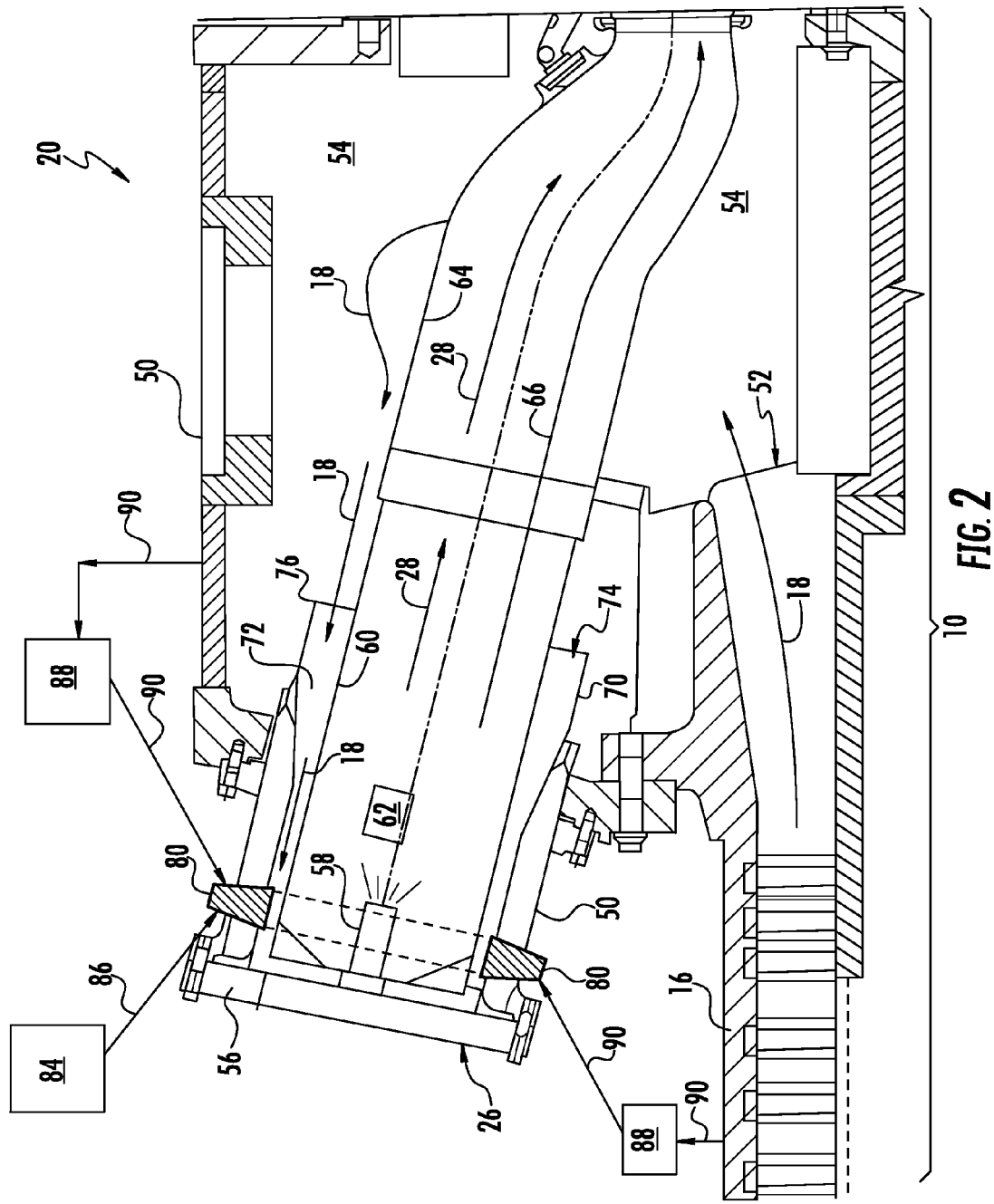
FIG. 2 is a cross sectional side view of a portion of an exemplary gas turbine that may incorporate various embodiments of the present invention.

The combustors 24 may include any type of combustors known in the art, and the present invention is not limited to any particular combustor design unless specifically recited in the claims. For example, the combustor 24 may be a can type or a can-annular type of combustor. FIG. 2 provides a cross-section side view of a portion of an exemplary gas turbine 10 including a portion of the compressor 16 and the combustion section 20 that may incorporate various embodiments of the present invention. As shown in FIG. 2, the combustion section 20 generally includes an outer casing 50 that is disposed downstream from a discharge outlet 52 of the compressor 16. The outer casing 50 at least partially defines a high pressure plenum 54 for receiving the compressed working 18 fluid from the compressor 16.

The combustor 26 generally includes an end cover 56 that is coupled to the outer casing 50. The end cover 56 may at least partially define the high pressure plenum 54. At least one fuel nozzle 58 extends downstream from the end cover 56 and/or downstream from the high pressure plenum 54.

A combustion liner 60 extends downstream from the fuel nozzle 58 within the outer casing 50 and at least partially through the high pressure plenum 54. A combustion chamber 62 is defined downstream from the high pressure plenum 54. In one embodiment, the combustion chamber 62 is at least partially defined within the combustion liner 60. The combustion chamber 62 is disposed downstream from the fuel nozzle 58. A transition duct 64 extends downstream from the combustion liner 60 and/or the combustion chamber 62. The transition duct 64 generally terminates adjacent to an inlet 66 of the turbine 30 (FIG. 1). As shown in FIG. 2, the combustion liner 60 and the transition duct 64 at least partially define a hot gas path 68 for routing the combustion gases 28 through the high pressure plenum 54 towards the inlet 66 of the turbine 30 (FIG. 1).

In one embodiment, the combustor 24 includes a flow sleeve 70 that at least partially surrounds at least a portion of the combustion liner 60. The flow sleeve 70 is radially separated from the combustion liner 60 so as to define a flow passage 72 therebetween. An inlet 74 to the flow passage 72 is defined at an upstream end 76 of the flow sleeve 70. The flow passage 72 provides for fluid communication of the compressed working fluid 18 between the high pressure plenum 54 and the combustion chamber 62. In one embodiment, the flow passage 72 provides for fluid communication between the high pressure plenum 54 and the combustion chamber 62 via the fuel nozzle 58.

Figure 3:
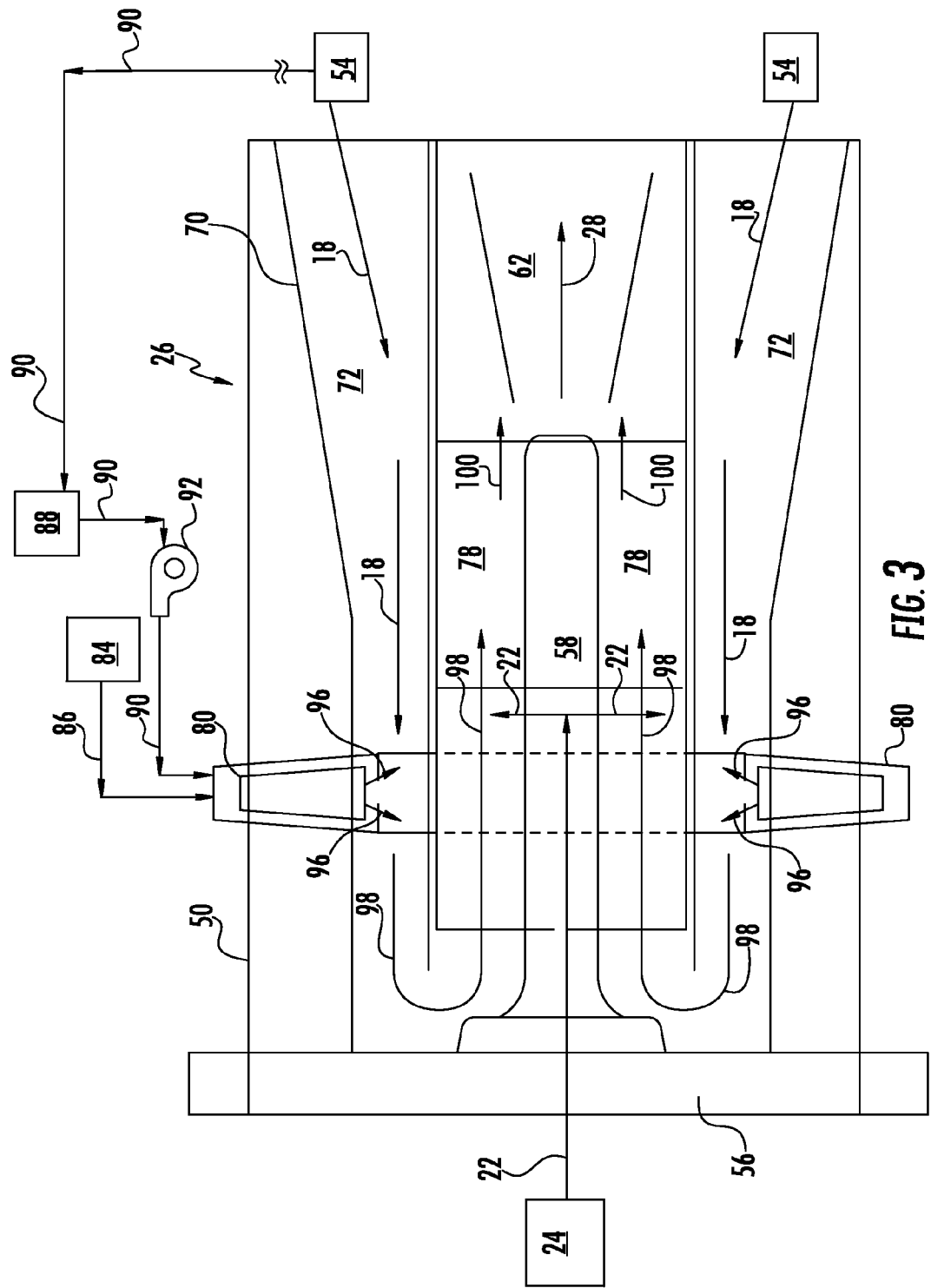
FIG. 3 is a functional block diagram of an exemplary combustor according to at least one embodiment of present invention.

FIG. 3 provides a functional block diagram of an exemplary combustor 26 including a pre-mix chamber 78 according to at least one embodiment of the present invention. As shown in FIG. 3, the pre-mix chamber 78 is defined downstream from the high pressure plenum 54. In one embodiment, the pre-mix chamber is disposed downstream from the flow passage 72 and upstream from the combustion chamber 66. The pre-mix chamber 78 may be at least partially defined by the fuel nozzle 58.

Figure 4:
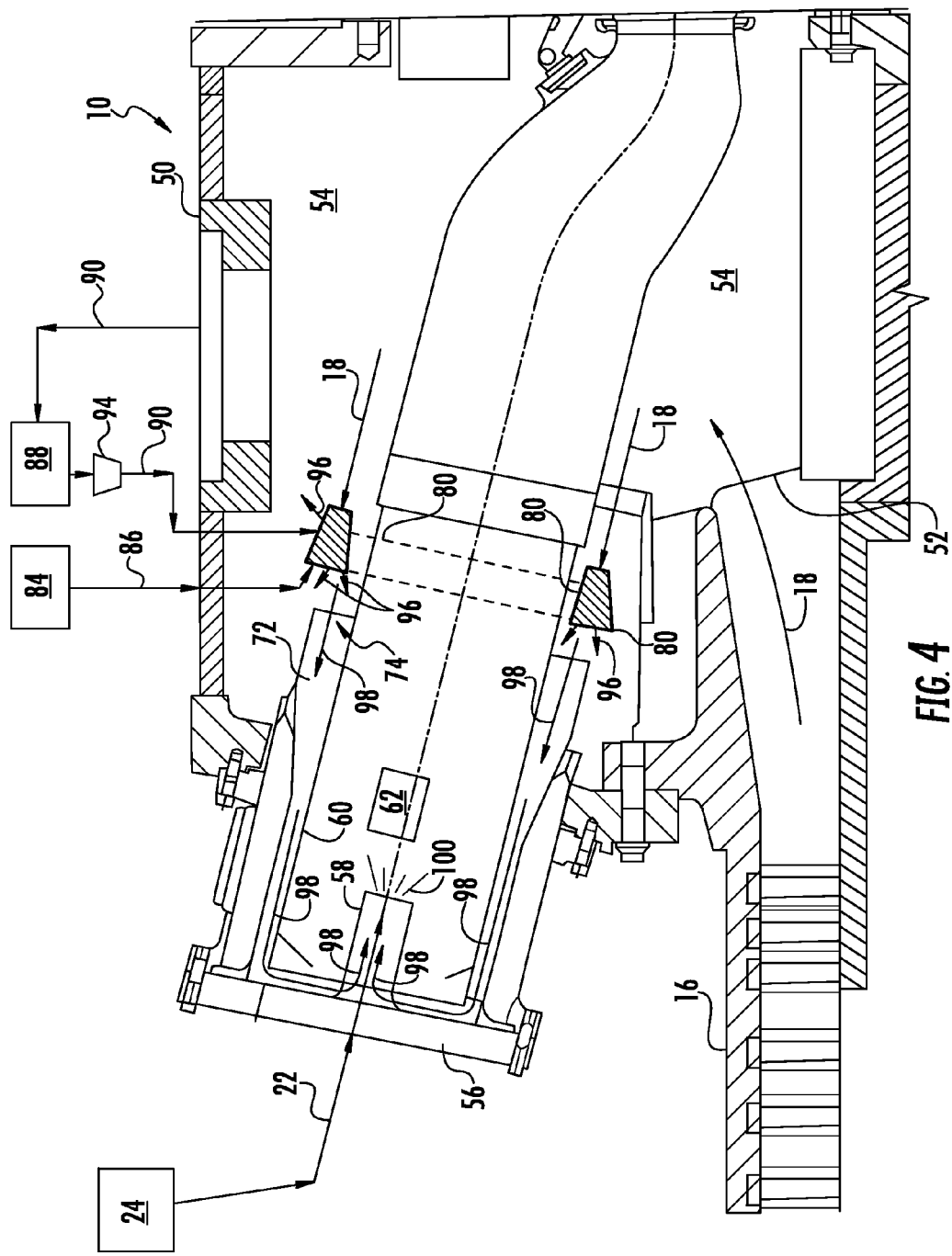
FIG. 4 is a cross sectional side view of a portion of the exemplary gas turbine as shown in FIG. 2, according to at least one embodiment of the present invention.
Figure 5:
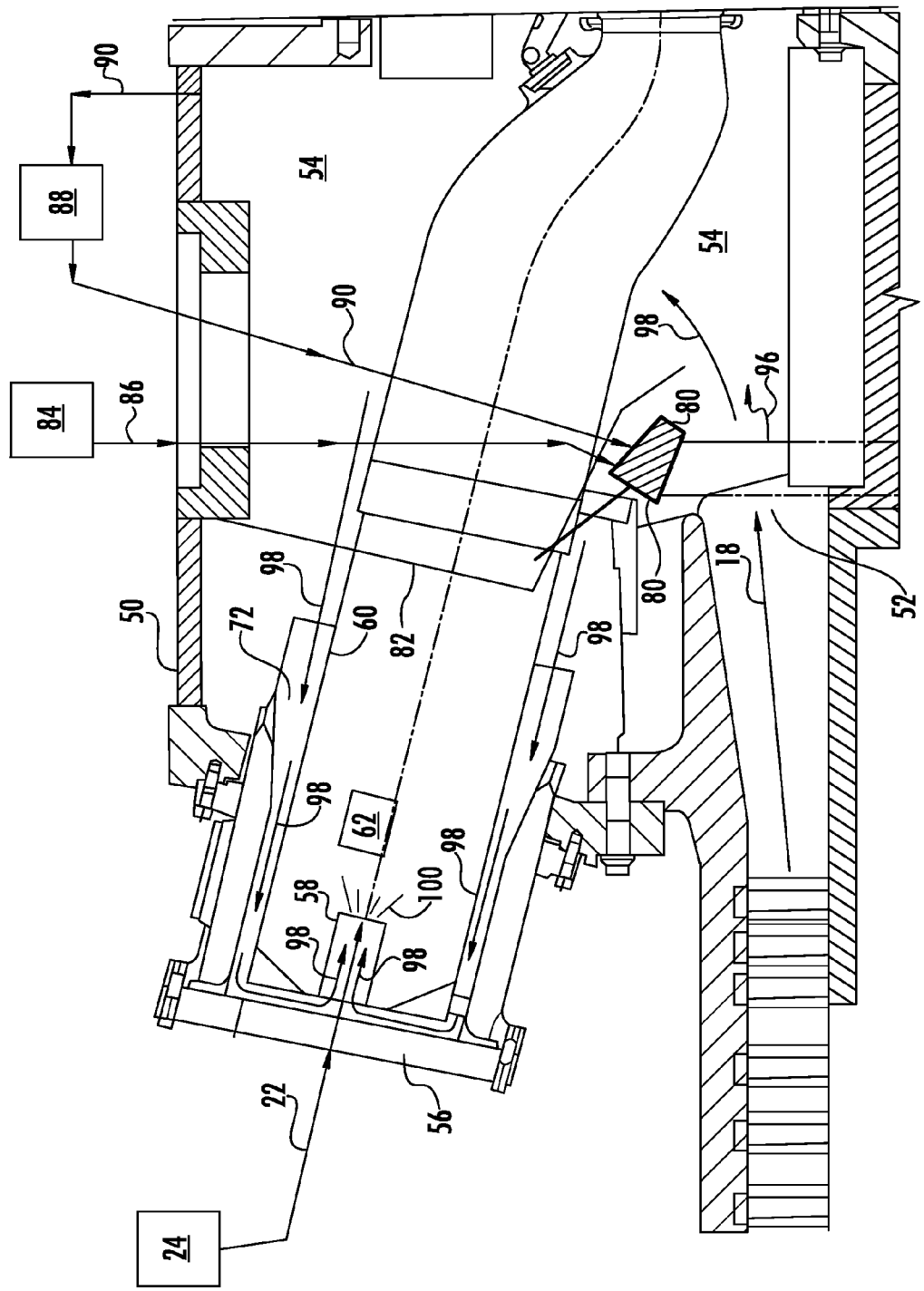
FIG. 5 is a cross sectional side view of a portion of the exemplary gas turbine as shown in FIG. 2, according to at least one embodiment of the present invention.

FIGS. 4 and 5 provide cross-section side views of the exemplary gas turbine 10 as shown in FIG. 2, according to various embodiments of the present invention. As shown in FIGS. 2, 3, 4 and 5, a catalytic combustor or heater 80 is disposed within the high pressure plenum 54 and/or within the flow passage 72 upstream from the combustion chamber 62 and/or upstream from the pre-mix chamber 78 so as to provide thermal energy to the working fluid 18 upstream from the combustion chamber 66 and/or upstream from the pre-mix chamber 78. The catalytic combustor 80 may include any catalyst suitable for fuel oxidation so as to release heat or thermal energy within the high pressure plenum 54 and/or upstream from the pre-mix chamber 78. For example, the catalyst may be a ceramic catalyst and/or a metal catalyst. Metal catalysts may include at least one of the platinum group metals such as ruthenium, rhodium, palladium, osmium, iridium and platinum. In addition or in the alternative, the metal catalyst may include perovskite, hexa-aluminate or zeolite or any other suitable catalyst.

In one embodiment, as shown in FIGS. 2 and 3, the catalytic combustor 80 extends at least partially within the flow passage 72 upstream from the combustion chamber 66. In a particular embodiment, as shown in FIG. 3, the catalytic combustor 80 extends at least partially within the flow passage 72 downstream from the high pressure plenum 54 and upstream from the pre-mix chamber 78. The catalytic combustor 80 may extend at least partially through the outer casing 50 and or the flow sleeve 70. In the alternative, the catalytic combustor 80 may be in thermal communication with an outer surface (not shown) of the flow sleeve 70. The catalytic combustor 80 may be integrated with the outer casing 50. The catalytic combustor 80 may extend at least partially around at least one of a portion of the outer casing 50, a portion of the combustion liner 60 or a portion of the flow sleeve 70.

In an alternate embodiment, as shown in FIG. 4, the catalytic combustor 80 at least partially surrounds at least a portion of the combustion liner 60 upstream from the inlet 74 to the flow passage 72. In this embodiment, the catalytic combustor 80 is disposed entirely within the high pressure plenum 54. In another embodiment, as shown in FIG. 5, the catalytic combustor 80 is disposed within the high pressure plenum 54 and entirely within the outer casing 50 proximate or adjacent to the compressor discharge outlet 52. In this embodiment, the catalytic combustor 80 may extend circumferentially around at least a portion of the shaft 32 (FIG. 1). In at least one embodiment, as shown in FIG. 5, a heat shield 82 is disposed between the catalytic combustor 80 and the combustion liner 60 and/or the transition duct 66.

In various embodiments as illustrated in FIGS. 2 through 5 and as previously disclosed herein, the catalytic combustor 80 may be coupled to a fuel supply 84 so as to provide a fuel 86 such as natural gas to the catalytic combustor 80. In particular embodiments the catalytic combustor 80 is connected to an oxidant supply 88 to provide an oxidant 90 such as a portion of the compressed working fluid 18 to the catalytic combustor 80. The oxidant supply 88 may include and/or may be in fluid communication with the high pressure plenum 54 (FIGS. 2, 4 and 5), the compressor 16 (FIG. 2) or an external oxidant source (not shown). In one embodiment, the oxidant supply 88 may include and/or be in fluid communication with a high pressure pump 92 (FIG. 3) and/or an auxiliary compressor 94 (FIG. 4) for increasing the pressure of the oxidant 90 prior to introduction into the catalytic combustor 80.

In operation, as shown in FIGS. 3, 4 and 5, the fuel 86 and oxidant 90 are supplied to the catalytic combustor 80 to provide for fuel oxidation, thereby resulting in a release of thermal energy 96 within the flow passage 72 as shown in FIG. 3, and/or within the high pressure plenum 54 as shown in FIGS. 4 and 5. As shown in FIGS. 3, 4 and 5, additional thermal energy 96 may be provided by exhaust gases that result from the fuel oxidation or catalytic combustion process. The thermal energy 96 is transferred to the compressed working fluid 18 as it flows across and/or past the catalytic combustor 80, thereby raising the temperature of the compressed working fluid 18 and providing a heated compressed working fluid 98 that flows downstream from the catalytic combustor 80 and into the combustion chamber 62.

The amount of thermal energy 96 that is transferred to the compressed working fluid 18 from the catalytic combustor 80 may be controlled as function of various operating conditions of the gas turbine 10, including but not limited to ambient temperature and load condition of the gas turbine 10. For example, during part load operation the temperature of the compressed working fluid 18 flowing to the combustor is much lower than during base load or full-speed/full load operation, thereby affecting the pre-mix operability range of the combustor 26. However, the catalytic combustor 80 may provide sufficient thermal energy 96 to the compressed working fluid 18 to expand the pre-mix operability range of the combustor during part-load and/or during low ambient temperature conditions, thereby improving emissions performance.

In particular embodiments, as shown in FIG. 3, the heated compressed working fluid 98 is routed into the pre-mix chamber 78 where it is mixed with the fuel 22 from the fuel supply 24 so as to provide a heated lean pre-mixed combustible mixture 100 to the combustion chamber 62 where it is burned. As a result, heat rise and heat release within the combustion chamber 62 and/or across the combustion system are reduced, thereby reducing the potential for combustion dynamics and reducing CO emissions.

In another embodiment, as shown in FIG. 4, the compressed working fluid flows from the compressor outlet 52 into the high pressure plenum 54. The compressed working fluid 18 is routed across the catalytic combustor 80 and the thermal energy 96 is transferred to the compressed working fluid 18 as it flows across the catalytic combustor 80 and into the flow passage 74. The heated compressed working fluid 98 is then routed through the flow passage 72 towards the end cover 56. The heated compressed working fluid 98 may then be directed through the fuel nozzle 58 and/or into the pre-mix chamber 78 (FIG. 3) and mixed with the fuel 22, thereby raising the temperature of the compressed working fluid 18 and providing the heated lean pre-mixed combustible mixture 100 to the combustion chamber 62.

In another embodiment, as shown in FIG. 5, the compressed working fluid flows from the compressor outlet 52 across the catalytic combustor 80 and into the high pressure plenum 54. The thermal energy 96 is transferred to the compressed working fluid 18 as it flows across the catalytic combustor 80 and into the high pressure plenum 54. The heated compressed working fluid 98 is then routed through the flow passage 72 towards the end cover 56. The heated compressed working fluid 98 is then directed through the fuel nozzle 58 and/or into the pre-mix chamber 78 (FIG. 3) and mixed with the fuel 22, thereby providing the heated lean pre-mixed combustible mixture 100 to the combustion chamber 62.

The several embodiments as described herein and as illustrated within FIGS. 2, 3, 4 and 5 provide various technological benefits over existing technologies for raising the temperature of the compressed working fluid within the combustor during low ambient temperature operation and/or during part-load operation of the gas turbine. For example, one benefit is that the gas turbine combustor may be operated in the lean pre-mix mode without the assistance of inlet bleed heating. This is especially desirable in cold weather climates where inlet bleed heat schedules are necessary to effectively increase the air temperature entering the gas turbine premix combustion system to prevent the combustion system from operating in a range of high dynamic pressure pulsations. In addition, the catalytic combustor provides a localized and direct heat input into the compressed working fluid which keeps boundary conditions within the combustion chamber substantially constant during low ambient temperature operation and/or during part-load operation, thereby potentially lowering NOx emissions and/or CO emissions during turndown operation and controlling combustion chamber dynamic pressure levels generally caused by a large heat rise and heat release within the combustion chamber. As a result, the gas turbine is more likely to remain dispatched or online to export power onto an electrical power transmission grid during off-peak power demands, thereby reducing operation and maintenance cost by reducing the number of gas turbine starting cycles. In addition, the amount of heating provided by the catalytic combustor may be controlled as function of various operating conditions including but not limited to ambient temperature and percent load of the gas turbine. This allows for greater control This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed:

1. A system for pre-heating a working fluid within a combustor, comprising:
  a. a compressor for providing the working fluid to the combustor;
  b. an outer casing disposed downstream from the compressor, wherein the outer casing at least partially defines a high pressure plenum that at least partially surrounds the combustor;
  c. a combustion chamber defined within the combustor, wherein the combustion chamber is disposed downstream from the high pressure plenum;
  d. a catalytic combustor disposed within the high pressure plenum upstream from the combustion chamber, wherein the catalytic combustor provides thermal energy to the working fluid upstream from the combustion chamber;
  e. a combustion liner that at least partially surrounds the combustion chamber, wherein the catalytic combustor extends at least partially circumferentially around and is radially spaced from an outer surface of the compression liner with respect to a centerline axis of the combustion chamber; and
  f. an external oxidant supply that is in fluid communication with the catalytic combustor.

2. The system as in claim 1, wherein the compressor includes a discharge outlet that is upstream from the high pressure plenum, wherein the catalytic combustor is disposed proximate to the discharge outlet.

3. The system as in claim 1, wherein the catalytic combustor extends at least partially through the outer casing.

4. The system as in claim 1, further comprising a heat shield disposed between the catalytic combustor and the combustion liner.

5. The system as in claim 1, further comprising a flow sleeve that surrounds the combustion liner and a flow passage defined between the combustion liner and the flow sleeve, the flow passage providing for fluid communication between the high pressure plenum and the combustion chamber, wherein the catalytic combustor is disposed upstream from the flow passage.

6. The system as in claim 1, further comprising a pre-mix flow chamber disposed downstream from the catalytic combustor and upstream from the combustion chamber.

7. The system as in claim 1, further comprising a high pressure fuel supply that is in fluid communication with the catalytic combustor.

8. A combustor for a gas turbine, comprising:
  a. a combustion liner;
  b. a combustion chamber defined within the combustion liner;
  c. a fuel nozzle disposed upstream from the combustion chamber, wherein the fuel nozzle at least partially defines a pre-mix flow chamber;
  d. an outer casing that surrounds the combustion liner;
  e. a high pressure plenum defined within the outer casing, wherein the high pressure plenum is upstream from the pre-mix flow chamber;
  f. a catalytic combustor disposed within the high pressure plenum upstream from the pre-mix flow chamber; and
  g. a flow sleeve that surrounds the combustion liner defines a flow passage between the combustion liner and the flow sleeve, wherein the catalytic combustor at least partially surrounds a portion of the combustion liner at a position that is upstream from the flow passage.

9. The combustor as in claim 8, wherein the high pressure plenum is in fluid communication with a discharge outlet of a compressor, the catalytic combustor being disposed proximate to the discharge outlet.

10. The combustor as in claim 8, wherein the catalytic combustor extends at least partially through the outer casing.

11. The combustor as in claim 8, wherein the catalytic combustor at least partially surrounds a portion of the combustion liner.

12. The combustor as in claim 8, further comprising a heat shield disposed between the catalytic combustor and the combustion liner.

13. The system as in claim 1, further comprising an external oxidant supply that is in fluid communication with the catalytic combustor, wherein the external oxidant supply includes an auxiliary compressor.

14. A gas turbine, comprising:
  a. a compressor for providing a flow of a compressed working fluid;
  b. a combustion section disposed downstream from the compressor, the combustion section having an outer casing that defines a high pressure plenum;
  c. a turbine disposed downstream from the combustion section; and d. wherein the combustion section further comprises:
   i. a combustor that extends within the high pressure plenum, the combustor having a combustion liner, a combustion chamber defined within the combustion liner downstream from the high pressure plenum and a fuel nozzle disposed upstream from the combustion chamber;
   ii. a catalytic combustor disposed within the high pressure plenum upstream from the combustion chamber, wherein the catalytic combustor provides thermal energy to the flow of the compressed working fluid; and
   iii. a heat shield disposed between the catalytic combustor and the combustion liner.

15. The gas turbine as in claim 14, wherein the catalytic combustor is integral with the outer casing.

16. The gas turbine as in claim 14, wherein the catalytic combustor at least partially surrounds a portion of the combustion liner.

17. The gas turbine as in claim 14, further comprising a flow sleeve that surrounds the combustion liner and a flow passage defined between the combustion liner and the flow sleeve, wherein the catalytic combustor at least partially surrounds a portion of the combustion liner at a position that is upstream from the flow passage.

\* \* \* \* \*